(No Model.)
2 Sheets—Sheet 1.
A. T. ATHERTON.
CARDING MACHINE.
No. 311,404.
Patented Jan. 27, 1885.
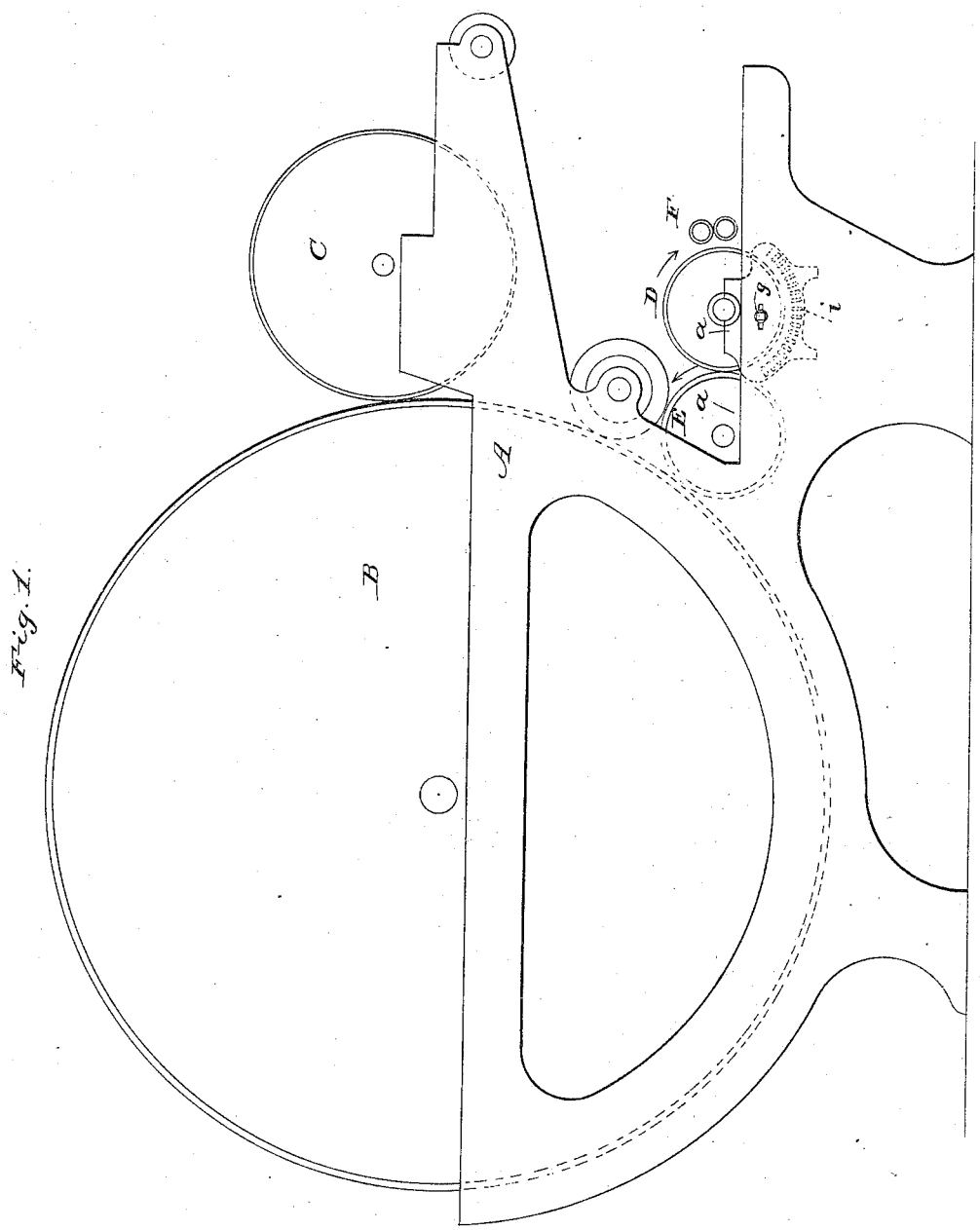
Witnesses:
Inventor:

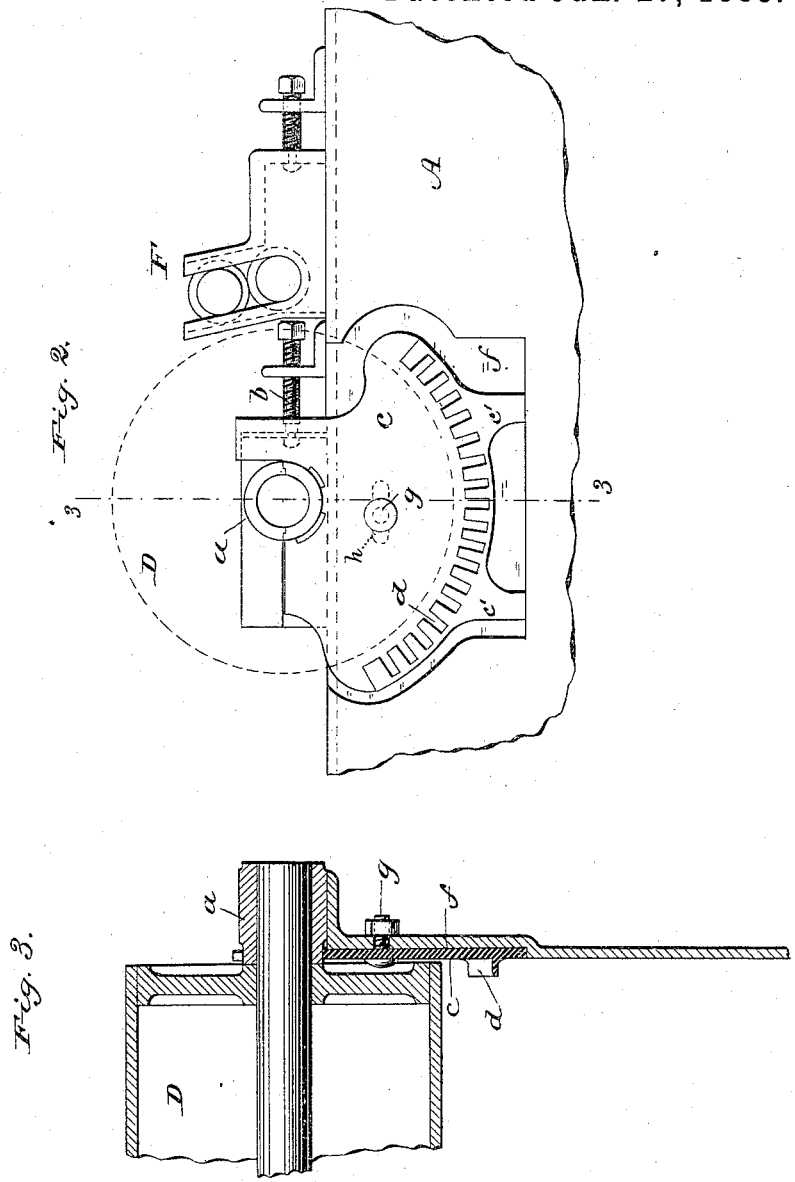

UNITED STATES PATENT OFFICE.

ABEL T. ATHERTON, OF LOWELL, MASSACHUSETTS.

CARDING-MACHINE.

SPECIFICATION forming part of Letters Patent No. 311,404, dated January 27, 1885.

Application filed April 29, 1884. (No model.)

*To all whom it may concern:*

Be it known that I, ABEL T. ATHERTON, of Lowell, in the State of Massachusetts, have invented a certain new and useful Improvement in Carding-Machines, of which the following is a specification.

My improvement has reference to those rolls of a carding engine or machine which are usually termed the "lickers-in." There are two of these rolls, each covered with card-clothing. They are intermediate between the feed-rolls and the carding-cylinder. One of them—termed the "leader"—takes the cotton from the feed-rolls; the other—termed the "carrier"—takes the cotton from the leader and delivers it to the carding-cylinder. Beneath the leader, and in proximity to it, is a curved grid, which, in connection with the leader, acts in a measure to clean the cotton preliminarily to the delivery of the latter to the carding-cylinder. The dirt and refuse separated from the cotton drop down through between the grid-bars, while the cotton itself is, by the action of the bars, prevented from following the refuse, and is directed to the carrier. By continued use the teeth of the carding-cylinder, as well as of the licker-in rolls, wear away, and consequently, in order to preserve the efficiency of the machine, it becomes necessary to set the licker-in rolls up nearer to one another and to the cylinder from time to time, to compensate for wear. Heretofore the grid under the leader-roll has been stationary; consequently it has been necessary to so shape and proportion it as to permit the leader to be set up toward the cylinder without liability of interfering or coming in contact with the grid; and to this end it has been customary to place that side or portion of the grid which is nearest the carding-cylinder at such a distance from the leader as to permit the requisite movement or adjustment of the latter in the direction of the carding-cylinder. Practice has demonstrated that the grid operates best when it conforms in curvature to the cylinder and is in close proximity to the latter throughout its whole extent. Under these conditions it acts most efficiently to separate the dirt and refuse from the cotton and to direct the latter to the carrier; but in proportion as it departs from these conditions its efficiency is impaired, and the refuse is permitted to pass to the carrier along with the cotton, and thus the stationary grid, which, as above stated, must of necessity be so shaped as to permit the leader to be set up toward the cylinder, does not possess the desired efficiency, and allows much of the refuse to pass over to the carrier with the cotton. It is my object to remedy this defect, and I attain my object by making the grid movable, and by so connecting it with the leader that it shall partake of and follow the movement of adjustment of the latter. In this way I can shape the grid so as to conform and be in close proximity to the leader throughout its whole extent, because when the leader is set up toward the cylinder the grid moves with it, and consequently the relation of the two remains entirely unchanged.

The accompanying drawings represent that embodiment of my invention which I on the whole prefer, and which I in practice have adopted.

Figure 1 is a side elevation of so much of a carding-machine as is needed for the purpose of explanation. Fig. 2 is an elevation of the inner face of one of the sides of the frame, showing one of the rack-plates in place therein. Fig. 3 is a section on line 3 3, Fig. 2, the shaft of the licker-in being shown in elevation.

A is the frame of the machine. B is the carding-cylinder. C is the doffer. D E are the lickers-in, and F are the feed-rolls. These parts are of the usual construction, and are driven in the usual way. I have therefore deemed it necessary to represent them to a great extent only diagrammatically, and have omitted the driving-gearing. The boxes $a$ of the two lickers-in are adjustable longitudinally, and are held in place by set or adjusting screws $b$, as shown in Fig. 2, with respect to the boxes of D. This is the usual arrangement of these boxes, and requires no further explanation.

Of the two lickers-in, D is the leader, and E is the carrier. The direction in which each revolves is indicated by an arrow. The cotton taken from the feed-rolls is carried down on the under side of the leader, and thence up on the upper side of the carrier, and from the latter is taken by the carding-cylinder. Beneath the leader is the curved grid, in the arrangement of which so that in its movement it shall follow the adjustment of the leader my improvement is comprised. Manifestly the grid can be thus connected to the leader or its boxes in a variety of ways, which will suggest themselves to the skilled mechanic. The best and most convenient arrangement for the purpose now known to me is that which is represented in the drawings. The grid is composed of two rack-plates, $c$, each provided with a series of slots, $d$, set in a curve corresponding to the curve the grid is to have, and grid-bars, (the ends of which are shown by dotted lines at $i$, Fig. 1,) which extend across from one plate to the other, and are seated at their ends in the slots $d$. The rack-plates are set in recesses $f$, cut in the interior opposite faces of the frame A at the proper points, and are provided at the bottom with legs or projections $c'$, which rest upon the bottoms of the recesses. The recesses are of sufficiently greater length than the plates to permit the latter all the longitudinal movement therein that may be required. Each plate at its upper edge is so shaped as to extend up on each side of the inwardly-projecting hub of the box $a$ under which it may happen to be placed. In this position it embraces the box in such a way that when the box is moved longitudinally of the frame the rack-plate must move also. In this way the grid must follow the boxes when they are adjusted or set up by their screws $b$, and thus the leader-roll and the grid preserve constantly the same relations to one another, notwithstanding changes in the adjustment of the leader.

To fasten the grid in adjusted position any suitable means may be employed. I can, and sometimes do, use a set-screw, $g$—one on each side of the machine—which passes into the adjoining rack-plate through a longitudinal slot, $h$, of proper length, in the frame. This provision, however, is not a necessity, and can be dispensed with.

Having described my improvement and the best way now known to me of carrying the same into practice, I would state, in conclusion, that I do not desire to be understood as restricting myself to the particular arrangement of parts hereinbefore described and illustrated; but

What I claim as new and of my own invention is—

1. The combination, with that one of the licker-in rolls known as the "leader," the boxes by which said roll is carried, the supporting-frame, and means for longitudinally adjusting the boxes on said frame, of a grid connected to said boxes substantially in the manner hereinbefore set forth, whereby the grid shall move with said boxes when the latter are adjusted longitudinally of the machine.

2. The combination of the frame, the grid composed of grid-bars and rack-plates supported and capable of longitudinal movement in recesses in said frame, and the longitudinally-adjustable leader-roll boxes engaging the said rack-plates, under the arrangement and for operation substantially as hereinbefore set forth.

In testimony whereof I have hereunto set my hand this 31st day of March, 1884.

ABEL T. ATHERTON.

Witnesses:
FRANK COBURN,
ALVIN F. CALL.